W. W. Haupt,
Corn Planter.
No. 89,404. Patented Apr. 27, 1869.
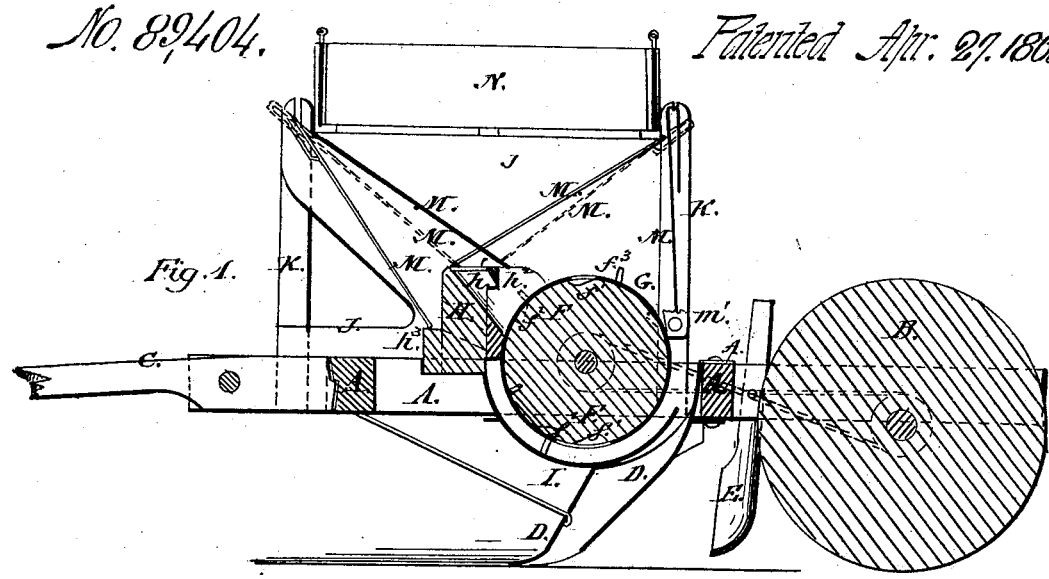
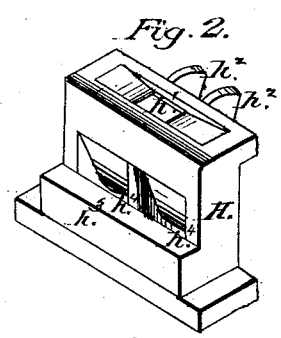
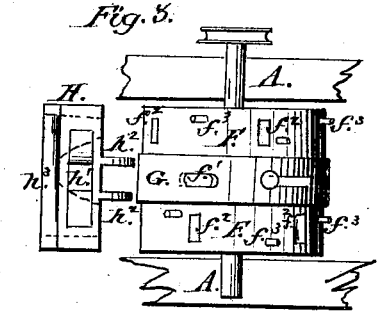
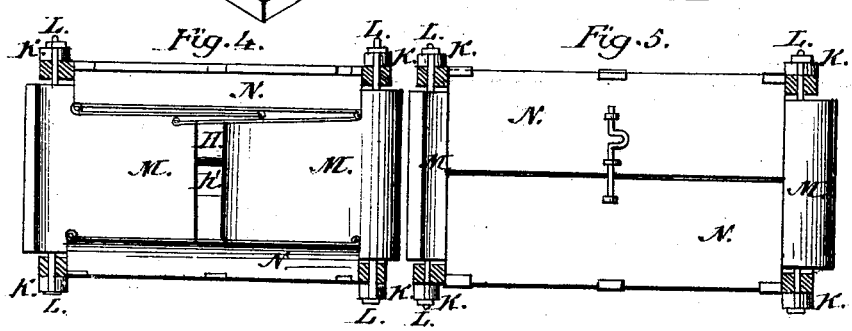
Witnesses:
A. W. Hingvist
John F. Brooks
Inventor:
W. W. Haupt
by Munn & Co.
Attys.

W. W. HAUPT, OF MOUNTAIN CITY, TEXAS.

Letters Patent No. 89,404, dated April 27, 1869.

IMPROVEMENT IN SEED-PLANTERS.

The Schedule referred to in these Letters Patent and making part of the same.

*To all whom it may concern:*

Be it known that I, W. W. HAUPT, of Mountain City, in the county of Hays, and State of Texas, have invented a new and useful Improvement in Seed-Planters; and I do hereby declare that the following is a full, clear, and exact description thereof, which will enable others skilled in the art to make and use the same, reference being had to the accompanying drawings, forming part of this specification.

Figure 1 is a vertical longitudinal section of my improved machine.

Figure 2 is a perspective view of the feed-block or bridge.

Figure 3 is a detail top view of the feed-block or bridge and dropping-cylinder.

Figure 4 is a top view, representing the machine adjusted for planting corn, and showing the extension-box partially raised.

Figure 5 is the same view as fig. 4, but showing the extension-box adjusted as a cover.

Similar letters of reference indicate corresponding parts.

My invention has for its object to furnish a simple and convenient seed-planter, which shall be so constructed and arranged that it may be easily and conveniently adjusted to plant various kinds of seeds; and It consists in the construction and combination of the various parts of the machine, as hereinafter more fully described.

A is the frame of the machine, the rear end of which rides upon the journals of the covering-roller B, and to the forward end of which is attached a beam or tongue, C.

D is the plow, for opening the furrow to receive the seed, and the standard of which is made hollow, to receive the seed from the dropping-cylinder, and convey it to the ground.

The upper part of the standard of the plow is made broad, so that it may receive the seed from any part of the dropping-cylinder.

The draught strain upon the plow D is sustained by a brace-rod or rods, the rear end of which is attached to said standard, and the forward end of which is attached to the forward part of the frame A.

E are the covering-plows or shovels, the standards of which are adjustably attached to the frame A, in the rear and upon each side of the plow D.

F is the dropping-cylinder, the journals of which revolve in notches or half bearings in the frame A, in such a position that the seed from said cylinder may drop into the spout in the plow-standard D.

In the middle part of the face of the cylinder F are formed cups or recesses, $f^1$, to receive the corn and convey it to the spout D.

The cups are recessed and adjusted in size to hold more or fewer kernels of corn by the band G, which passes around the middle part of the cylinder F, and has holes or slots formed through it corresponding in position with the position of the cups $f^1$.

The band G, when adjusted, is secured in place by screws passing through slots in the said band, and screwing into the cylinder F.

In the face of the cylinder F, at the sides of the band G, are formed long cups or recesses, $f^2$, to receive the kernels of wheat or other grain, and convey them to the spout D.

The size of the holes $f^2$ may be adjusted by bands in the same manner as the cups $f^1$.

To the face of the cylinder F are attached teeth, $f^3$, for use in planting cotton-seed.

The teeth $f^3$ may be so formed that when not required for use, they may be screwed into the cylinder F out of the way.

To one of the journals of the roller B, and to one of the journals of the cylinder F, are attached pulleys, around which passes a band, so that the said cylinder may be driven from the said roller.

H is the seed-block or bridge, the ends of which rest in notches in the frame A, so that it may be conveniently removed when desired.

In the middle part of the upper side of the block H is formed a hole or opening, $h^1$, which leads out through the rear side of said box, to conduct the corn to the dropping-cylinder.

Upon the rear side of the block H are formed flanges, $h^2$, fitting upon the face of the cylinder F, to prevent the corn from spreading over the face of the cylinder F, and keep it in such a position as to enter the cups $f^1$, to be carried to the spout D.

Upon the forward side of the block H is formed a shoulder, $h^3$, and in the body of said block, just above the said shoulder, are formed holes, $h^4$, leading in a downwardly-inclined direction through the block H, and having their opening upon the lower part of the inner side of said block.

As the teeth $f^3$ prevent the block H from being set close to the cylinder F, the grain from the holes $h^4$ is allowed to drop into the concave I, secured to the frame A, below the cylinder F, from which concave they are taken by the cups $f^2$, and carried to the spout D.

By this construction, the kernels of grain are taken by the cups and carried to the spout D, through the air, thus preventing the friction and wear which are unavoidable when the grain is carried by the dropping-cylinder through the mass of grain in the hopper, and resting upon said cylinder.

J are the side-boards of the seed-box, the ends of which are securely attached to the posts K, the lower ends of which enter mortises or holes in the frame A, and the upper ends of which, at each end of the machine, are connected by rods L, which pass through holes or slots in the upper ends of the said posts, and which are formed with a head upon one end, and a screw-nut upon the other, so that they may be easily and quickly loosened, tightened, or removed, as desired.

M are the end-plates of the seed-box, which are hinged to the rods L, by means of long keepers attached to the upper parts of the outer sides of said plates, as shown in fig. 1.

When the machine is to be used for planting cotton-seed, the forward plate M is so adjusted that its lower end may rest upon the rear side of the block H, and the rear plate M is so adjusted that its lower end may rest in one or the other of the notches in the plates $m'$, attached to the lower part of the rear ends of the sides of the seed-box, so that the space or opening between the lower end of the rear-end plates M, and the rear side of the cylinder F may be greater or less, according to the amount of cotton-seed to be planted to the acre.

This arrangement of the plates M is shown in black lines in fig. 1.

When the machine is to be used for planting corn, the lower ends of both the plates M rest upon the top of the seed-block H, as shown in red in fig. 1.

When the machine is to be used for planting wheat or other grain, the lower end of the rear-end plate rests upon the forward edge of the block H, and the lower end of the forward-end plate rests upon the shoulder $h^3$, upon the forward side of said block H, as shown in blue in fig. 1, so that all that is required to adjust the machine for planting different kinds of seeds is to adjust the position of the lower ends of the end-plates M.

The end-plates M are secured in place when adjusted by screwing up the nuts upon the rods L.

N is an extension folding box, the ends of the sides and ends of which are detachably connected to each other by rods passing through ears formed upon the said ends, and the lower edges of the sides of which are hinged to the upper edges of the side-boards J, so that when not required for use as an extension of the seed-box, the said box N may be folded down upon the top of the said seed-box to serve as a cover, or may be folded down along the outer sides of the side-boards J, so as to be entirely out of the way.

Having thus described my invention,

I claim as new, and desire to secure by Letters Patent—

1. Constructing the dropping-cylinder F, with teeth $f^3$, for dropping cotton-seeds, and with two or more sets of cups for different kinds of grain, so that the cylinder may be used without change for planting different kinds of seeds, substantially as herein shown and described.

2. The seed-block or bridge H, constructed substantially as herein shown and described, to support the lower ends of the end-plates M in different positions, and to guide the different kinds of seeds to their appropriate cups, as set forth.

3. The seed-box J K L M, constructed with adjustable hinged end-boards M, in combination with the dropping-cylinder F and seed-block H, substantially as herein shown and described, and for the purpose set forth.

4. The hinged and folding extension-box N, constructed substantially as herein shown and described, in combination with the seed-box J K L M, as and for the purpose set forth.

5. An improved seed-planter, formed by the combination of the furrowing-plow D, having a conducting spout, with a broad upper end formed, in its standard covering-plows E, covering-roller B, dropping-cylinder F, seed-block H, seed-box J K L M, and concave I, with each other and with the frame A, substantially as herein shown and described, and for the purpose set forth.

The above specification of my invention, signed by me, this 20th day of January, 1869.

WM. W. HAUPT

Witnesses:
T. A. BREEDLOVE,
H. C. BREEDLOVE.